United States Patent
Greenwood et al.

(10) Patent No.: US 9,703,849 B2
(45) Date of Patent: Jul. 11, 2017

(54) INTEGRATING DATA TRANSFORM TEST WITH DATA TRANSFORM TOOL

(71) Applicant: International Business Machines Corporation, Armonk, NY (US)

(72) Inventors: Leonard D. Greenwood, Beds (GB); Arron J. Harden, Olney (GB); Martin J. Sanders, Bedford (GB); Julian J. Vizor, Milton Keynes (GB)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 411 days.

(21) Appl. No.: 14/013,078

(22) Filed: Aug. 29, 2013

(65) Prior Publication Data
US 2014/0081902 A1    Mar. 20, 2014

(30) Foreign Application Priority Data

Sep. 20, 2012 (GB) .................................. 1216761.5

(51) Int. Cl.
*G06F 9/44* (2006.01)
*G06F 17/30* (2006.01)
*G06F 11/36* (2006.01)

(52) U.S. Cl.
CPC ...... *G06F 17/30563* (2013.01); *G06F 11/368* (2013.01); *G06F 8/33* (2013.01);
(Continued)

(58) Field of Classification Search
CPC .... G06F 11/3664; G06F 11/3688; G06F 8/34; G06F 11/3684; G06F 11/3672; G06F 11/3668; G06F 8/33
See application file for complete search history.

(56) References Cited

U.S. PATENT DOCUMENTS 941,866 A    11/1909  Fourcault
1,807,873 A    6/1931  Reece et al.
(Continued)

OTHER PUBLICATIONS

Ajay Sood, IBM InfoSphere DataStage job validation steps using IBM Optim Test Data Management Solution, Mar. 28, 2013, retrieved online on Feb. 22, 2017, pp. 1-32. Retrieved from the Internet :<URL: https://www.ibm.com/developerworks/data/library/techarticle/dm-1303datastagejobvalidation/>.*
(Continued)

*Primary Examiner* — Thuy Dao
*Assistant Examiner* — Hanh T Bui
(74) *Attorney, Agent, or Firm* — Cantor Colburn LLP

(57) ABSTRACT

Embodiments relate to integrating data transform test with a data transform tool. A method and system are described for creating a data transform test for a data transform job having a data transform script, the method includes determining all data transform units available in the data transform job, determining a subset of the available data transform units for a new test, and generating a subset test execution script for the subset of data transform units from the data transform script. The method further includes determining boundary test data at each boundary of the subset of data transform units, defining a data transform test, and saving the data transform test for later testing. The data transform test includes the subset of data transform units with subset test execution script and with boundary test data.

22 Claims, 15 Drawing Sheets

(52) U.S. Cl.
CPC ...... *G06F 11/3664* (2013.01); *G06F 11/3668* (2013.01); *G06F 11/3672* (2013.01); *G06F 11/3684* (2013.01); *G06F 11/3688* (2013.01)

(56) References Cited

U.S. PATENT DOCUMENTS

| | | | |
|---|---|---|---|
| 2,478,090 A | 8/1949 | Devol | |
| 6,662,312 B1* | 12/2003 | Keller | G06F 11/3688 714/38.14 |
| 7,139,779 B1 | 11/2006 | Kornelson et al. | |
| 8,024,369 B2 | 9/2011 | Pellegrini et al. | |
| 2003/0140138 A1* | 7/2003 | Dygon | G06F 11/3688 709/224 |
| 2007/0136324 A1 | 6/2007 | Xu et al. | |
| 2007/0240118 A1* | 10/2007 | Keren | G06F 11/3684 717/124 |
| 2008/0066058 A1* | 3/2008 | Aoyama | G06F 9/4448 717/125 |
| 2009/0158255 A1* | 6/2009 | Yoon | G06F 11/3672 717/124 |
| 2011/0251874 A1 | 10/2011 | Banthia et al. | |
| 2011/0295795 A1* | 12/2011 | Venkatasubramanian | G06F 17/30563 707/602 |
| 2011/0307864 A1* | 12/2011 | Grechanik | G06F 11/3696 717/124 |
| 2012/0150820 A1* | 6/2012 | Sankaranarayanan | G06F 17/30303 707/690 |
| 2012/0284223 A1* | 11/2012 | Belyy | G06F 17/30563 707/601 |
| 2013/0173529 A1* | 7/2013 | Erla | G06F 17/30563 707/602 |
| 2013/0311164 A1* | 11/2013 | Katz | G06F 11/3652 703/28 |
| 2014/0082424 A1* | 3/2014 | Sanders | G06F 11/3664 714/38.1 |
| 2014/0101639 A1* | 4/2014 | Brown | G06F 11/3688 717/124 |
| 2015/0020049 A1* | 1/2015 | Caufield | G06F 11/3684 717/124 |
| 2015/0154097 A1* | 6/2015 | Duda | G06F 11/3688 714/38.1 |
| 2015/0254166 A1* | 9/2015 | Harden | G06F 17/30563 717/124 |
| 2016/0034379 A1* | 2/2016 | Shah | G06F 11/3664 707/602 |

OTHER PUBLICATIONS

Na Meng et al., Sydit: Creating and Applying a Program Transformation from an Example, ACM, Sep. 2011, retrieved online on Feb. 22, 2017, pp. 440-443. Retrieved from the Internet: <URL: http://delivery.acm.org/10.1145/2030000/2025185/p440-meng.pdf?>.*

Ramasamy, Venkatesh "International Journal of Research in Commerce, It & Management", vol. N. 2, (2012), Issue No. 1, Jan., ISSN 2231-5756; www.ijrcm.org.in; 158 pgs.

Thomsen et al., "ETLDiff: A Semi-automatic Framework for regression Test of ETL Software", Data Warehousing and Knowledge Discovery Lecture Notes in Computer Science, 2006, vol. 4081, 2006, 2 pgs.

Author Unknown—Unit Test "Data Warehousing ETL Unit Testing" dated Jan. 17, 2012 at 12:49 p.m., http://www.myonlinetrainings.com/study-material/Funda/Data Ware . . . ; 9 pgs.

* cited by examiner

Figure 7E

Data Transform Subset Tester GUI 700

Subset Tester Toolbar 704: Create 704.2 | Boundary 704.4 | Test 704.6 | Edit 704.8 | Delete 704.10

Data Transform Job Frame 706

Job Name 710 | 203.1

Data Transform Editor 713

Boundary Frame 708

Test Name 712 | 206.1.1

Boundary Table 210.1.1

| Boundary | B1 | B2 | B3 | B4 |
|---|---|---|---|---|
| Selection | Default | Default | Default | Default |
| Source or Target | | | | |
| Boundary Field | | | | |

INTEGRATING DATA TRANSFORM TEST WITH DATA TRANSFORM TOOL

CROSS REFERENCE TO RELATED APPLICATIONS

This application claims priority to GB Application No. 1216761.5, filed Sep. 20, 2012, and all the benefits accruing therefrom under 35 U.S.C. §119, the contents of which in its entirety are herein incorporated by reference.

BACKGROUND

This invention relates to a method and apparatus for integrating data transform test with a data transform tool such as one based on extract transform load (ETL) or extract load transform (ELT) architectures.

At its simplest level a data transform job is a process that will read data from one source (such as a database), transform it (for example, remove trailing spaces), and finally write it to a target (such as a file). In a large organization, a given data transform job environment may have thousands of jobs that are relied on to run the organization. Since such jobs have a critical nature there is understandably a significant investment in terms of both time and resource needed to ensure these jobs produce the correct results.

The typical life-cycle for a set of data transform jobs is to move from a development system where they are first created, to a formal test system where they are verified to be functionally correct, and finally to a production system where they 'go live' and are run as part of an automated schedule. Any subsequent modification to these jobs requires they go back to the development system, then re-verified on the test system, before they can be moved back on to the production system.

A reasonably sized project consisting of a few hundred jobs can require many months in a test phase and a lot of this time is spent simulating the production environment and where necessary sending jobs back to the development environment to fix defects. Every job that has a defect needs to be fixed and re-tested, often requiring downstream jobs to also be re-tested. The main downside of such an iterative development and testing cycling is the time it takes to verify all jobs are functionally correct and can therefore be moved into the production environment. Managing change control can also be a big problem. For example, if jobs that are in production need to be modified to cope with changes to business requirements then development and test cycle needs to be restarted. This creates delays in implementing the business changes and has the risk that unrelated functionality that is relied upon is inadvertently broken. Job developers will typically perform ad-hoc unit testing of the logic in their jobs before passing them over for a formal testing phase. This can be done by creating temporary copies of the job instead.

SUMMARY

According to one embodiment, a method for creating a data transform test for a data transform job having a data transform script includes determining all data transform units available in the data transform job. The method also includes determining a subset of the available data transform units for a new test and generating a subset test execution script for the subset of data transform units from the data transform script. The method further includes determining boundary test data at each boundary of the subset of data transform units, defining a data transform test, and saving the data transform test for later testing. The data transform test includes the subset of data transform units with subset test execution script and with boundary test data.

According to another embodiment, a system for creating a data transform test for a data transform job having a data transform script includes a process engine for determining all data transform units available in the data transform job. The system also includes a process engine for determining a subset of the available data transform units for a new test and a process engine for generating a subset test execution script for the subset of data transform units from the data transform script. The system further includes a process engine for determining boundary test data at each boundary of the subset of data transform units, a process engine for defining a data transform test, and storage for saving the data transform test for later testing. The data transform test includes the subset of data transform units with subset test execution script and with boundary test data.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

FIGS. 7A, 7B, 7C, 7D, 7E, 7F, 7G and 7H are example screen shots of a graphical user interface of an exemplary embodiment.

DETAILED DESCRIPTION

Figure 1:
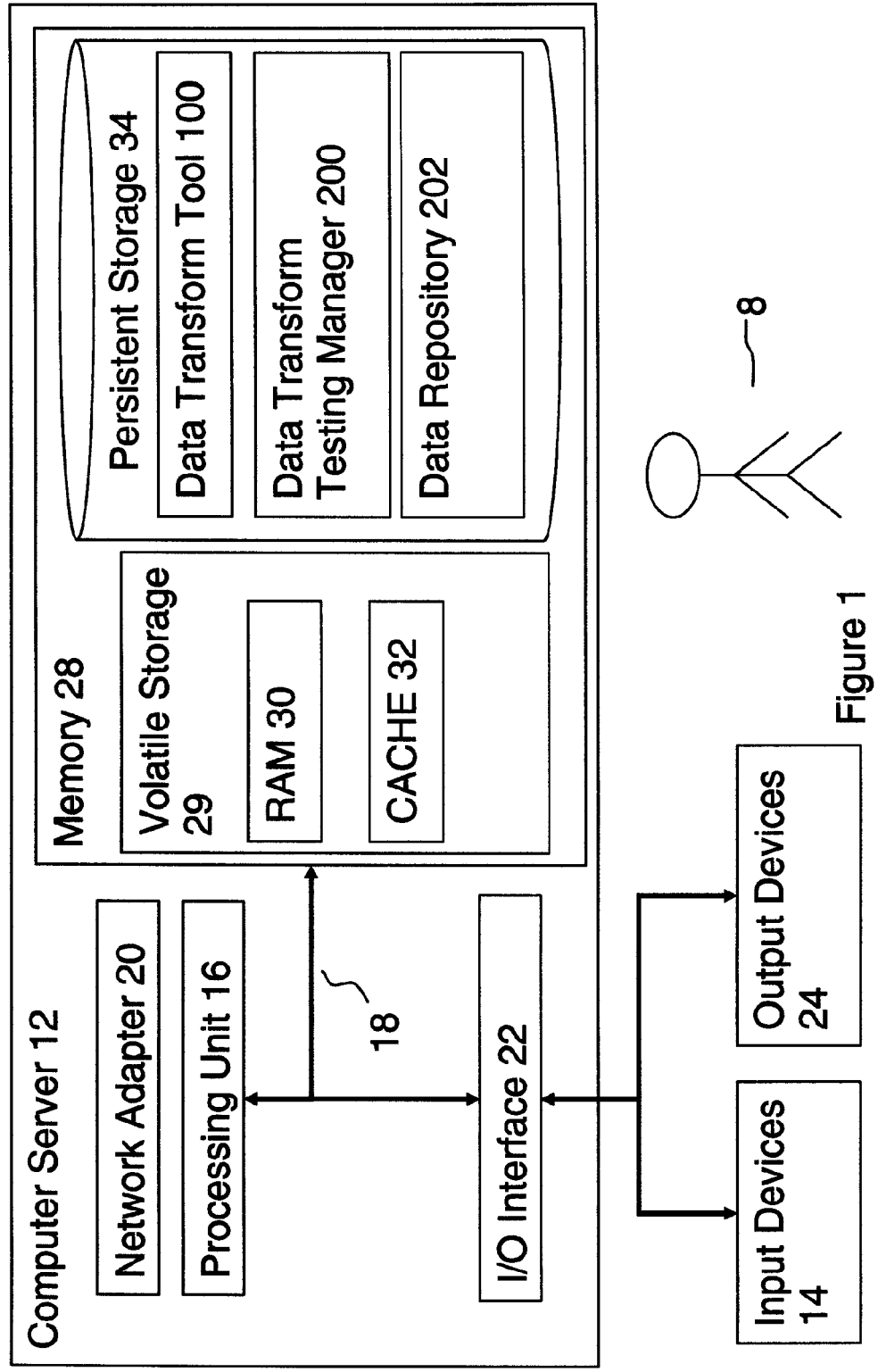
FIG. 1 is a deployment diagram of an exemplary embodiment.

Referring to FIG. 1, an exemplary embodiment is a data transform tool deployed in computer processing system 10. Computer processing system 10 is operational with numerous other general purpose or special purpose computing system environments or configurations. Examples of well-known computing processing systems, environments, and/or configurations that may be suitable for use with computer processing system 10 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices.

Computer processing system 10 may be described in the general context of computer system-executable instructions, such as program modules, being executed by a computer system. Generally, program modules may include routines, programs, objects, components, logic, data structures that perform particular tasks or implement particular abstract data types. Computer processing system 10 may be embodied in distributed cloud computing environments where tasks are performed by remote processing devices that are linked through a communications network. In a distributed cloud computing environment, program modules may be located in both local and remote computer system storage media including memory storage devices. As shown in FIG. 1, computer processing system 10 is shown in the form of a general-purpose computer server 12. The components of computer server 12 include: processing unit 16; memory 28; and a bus 18 that couples memory 28 and I/O interface 22 to processing unit 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Memory 28 includes computer system readable media in the form of volatile memory 29 and non-volatile persistent storage 34. Volatile memory 29 comprises random access memory (RAM) 30 and cache memory 32. Computer processing system 10 may further include other removable and/or non-removable, volatile and/or non-volatile computer system storage media. Persistent storage 34 typically comprises non-removable magnetic disk drive. Although not shown, removable persistent storage could be provided including a removable non-volatile magnetic disk (for example a floppy disk), a removable, non-volatile optical disk such as a compact disk read only memory (CD-ROM), or removable digital video disk read only memory (DVD-ROM). In such instances, each can be connected to bus 18 by one or more data media interfaces.

Memory 28 comprises a set of program modules configured to carry out the functions of embodiments, said modules comprising: data transform tool 100, data transform testing manager 200 and data repository 202. Further program modules are stored in memory 28 that support an exemplary embodiment but are not shown including firmware, boot strap program, operating system, and support applications. Each of the operating system, support applications, other program modules, and program data or some combination thereof, may include an implementation of a networking environment. At least one of the above program modules can be provided to carry out the functions and/or methodologies of embodiments of the invention as described herein. Computer processing system 10 may also communicate with user 8 through one or more input devices 14 and output devices 24 connected via input/output (I/O) interface 22. External devices can include a keyboard, a pointing device, a printer, a scanner and any external input or output device. Still yet, computer processing system 10 can communicate with one or more networks such as a local area network (LAN), a general wide area network (WAN), and/or a public network (for example, the Internet) via network adapter 20. As depicted, network adapter 20 communicates with the other components of computer server 12 via bus 18. It should be understood that although not shown, other hardware and/or software components could be used in conjunction with computer processing system 10. Examples, include, but are not limited to: microcode; device drivers; redundant processing units; external disk drive arrays; redundant array of independent disks (RAID) systems; tape drives; and data archival storage systems.

Figure 2A:
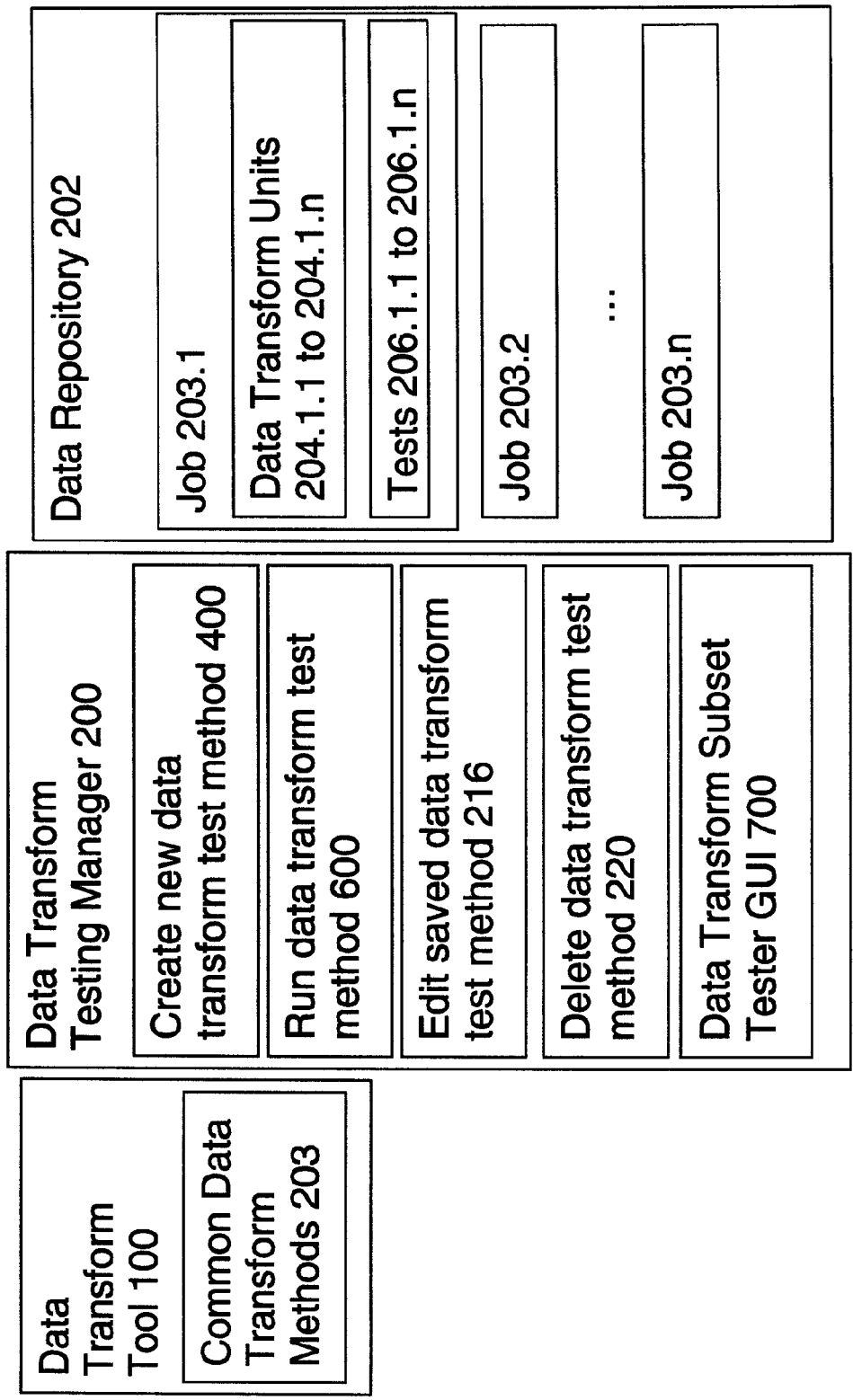
FIGS. 2A and 2B are component diagrams of an exemplary embodiment.

Referring to FIG. 2A components of the present embodiment comprise: data transform tool 100; data transform testing manager 200; and data repository 202. Data transform tool 100 comprises common data transform methods 203 such as would be found in a data transform tool such as IBM DataStage products. Data transform testing manager 200 comprises: create new data transform test method 400; run data transform test method 600; edit data transform test method 216; delete data transform test method 220; and data transform subset tester graphical user interface (GUI) 700. Create new data transform test method 400 is for creating a new data transform test and is described in more detail below with reference to FIG. 4. Run data transform test method 600 is for testing a saved data transform test and is described in more detail below with reference to FIG. 6. Edit data transform test method 216 is for providing a user interface for editing a saved data transform test. Delete data transform test method 220 is for providing a user interface for deleting a saved data transform test.

Data transform subset tester graphical user interface (GUI) 700 is for providing a user interface for creating new data transform text method 400 and comprises a data transform editor 713. Data transform subset tester GUI 700 is described in more detail below with reference to FIG. 7A to 7H.

Data repository 202 comprises data transform jobs (only example data transform job 203.1 is shown). Example Job 203.1 comprises one or more data transform units 204.1.1 to 204.1.n and one or more tests 206.1.1 to 206.1.n. Tests 206.1.1 to 206.1.n and job 203.1 are tightly coupled data structures in that they are associated and designed to function together. Advantageously tests 206.1.1 to 206.1.n can be easily moved with job 203.1 from one physical location to another since they are in the same data structure.

A data transform unit such as 204.1.1 is a fundamental data transform unit defining a unit in a data transform job. A group of connected data transform units define a data transform job. Each data transform unit comprises an execution script that is executed when the data transform job is performed.

Figure 2B:
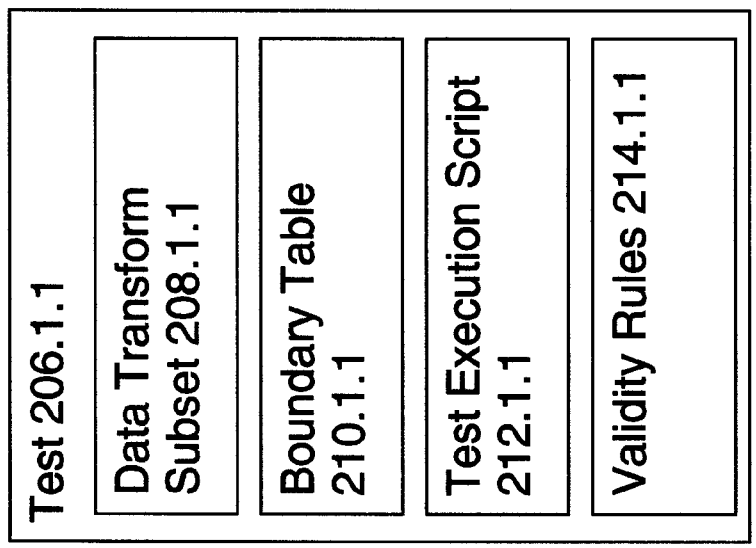

Referring to FIG. 2B, a test 206.1.1 comprises the following example data structures: data transform subset 208.1.1; boundary table 210.1.1; test execution script 212.1.1; and validity rules 214.1.1. Other tests, for example 206.n.m comprises corresponding data structures 208.n.m; 210.n.m; 212.n.m; and 214.n.m where n and m are any number.

Boundary table 210.1.1 is for holding data options relating to the source values at the source boundary of the test subset and the target values at the target boundary of the test subset. Target values can be references to validity rules stored in validity rules 214.1.1.

Test execution script 212.1.1 is for storing a test execution script that is formed from individual scripts of data transform units within the data transform subset.

Validity Rules 214.1.1 are for storing rules that are applied to output results of the test in order to verify the result.

Figure 3:
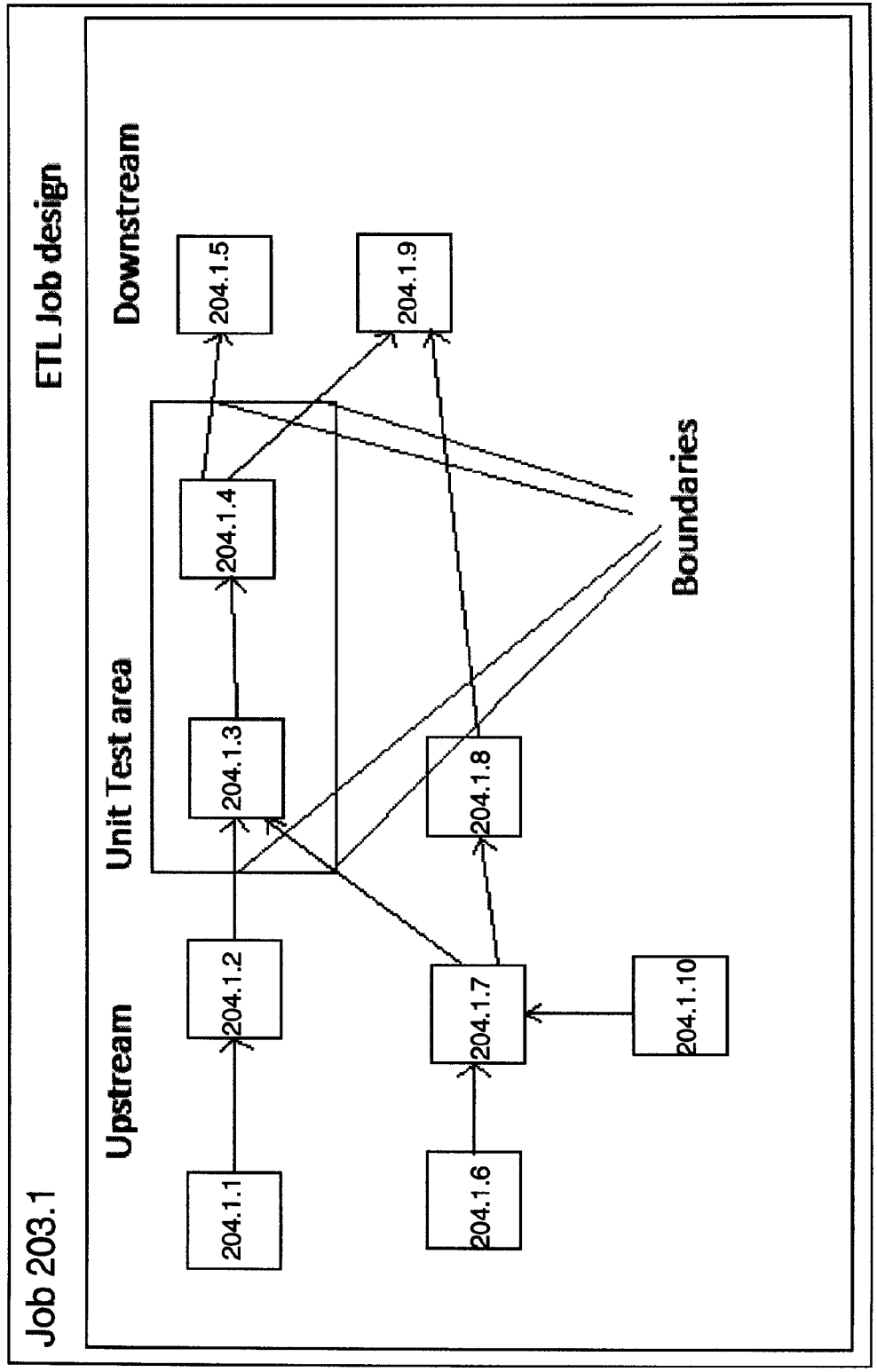
FIG. 3 is a data flow diagram of an example data transform job of an exemplary embodiment.

Referring to FIG. 3, an example graphical representation of a data transform job is shown. The graphical representation of the data transform job comprises a plurality of data transform units 204.1.1 to 204.1.10 connected with data flow connectors whereby there is a direction of data flow (show by the arrow labeled 'Data Flow'). Data transform subset GUI 700 provides for selection of one or more data transform units to form the data transform subset for a new test. In the example representation, the selected data transform units are shown inside a box labeled 'Unit Test area'. Data transform units that feed input into the unit test area box are generally labeled 'Upstream' and data transform units that received output data are generally labeled 'Downstream'. The data transform testing manager 200 determines the inputs and outputs of the unit test area box and these are labeled 'Boundaries'.

Figure 4:
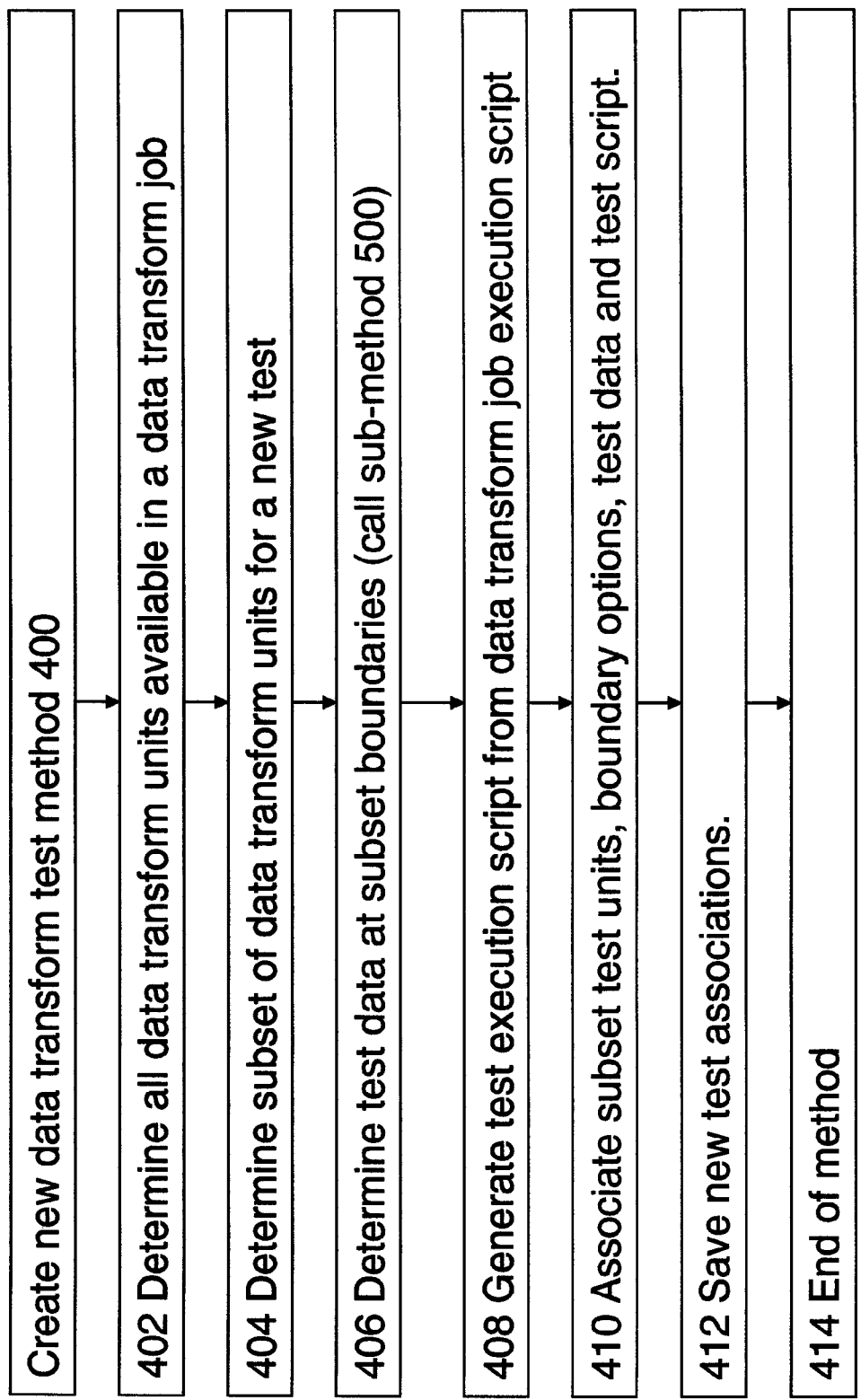
FIG. 4 is a flow diagram of a create new data transform test method according to an exemplary embodiment.

Referring to FIG. 4 a flow diagram of a process to create new data transform test method 400 according to the present embodiment comprises logical process blocks 402 to 414. As shown at block 402, the method 400 includes determining all the data transform units available in a data transform job by identifying and analyzing the job in the data repository 202.

As shown at block 404, the method 400 includes determining a subset of data transform units for a new test. In an exemplary embodiment this is achieved using data transform subset tester GUI 700 but in other interfaces a simple or hierarchical list with selection options could be used.

As shown at block 406, the method 400 includes determining test data options at subset boundaries. An exemplary embodiment calls sub-method 500 to make one selection or a combination of selections from one or more methodologies but other embodiments are envisaged that use a fixed method (for example one of those from sub-method 500).

As shown at block 408, the method 400 includes generating a test execution script from data transform job execution scripts of the data transform subset. As shown at block 410, the method 400 includes associating data transform subset, boundary options, test data and test script as new test. As shown at block 412, the method 400 includes saving the new test association. As shown at block 414, the method 400 concludes.

Figure 5:
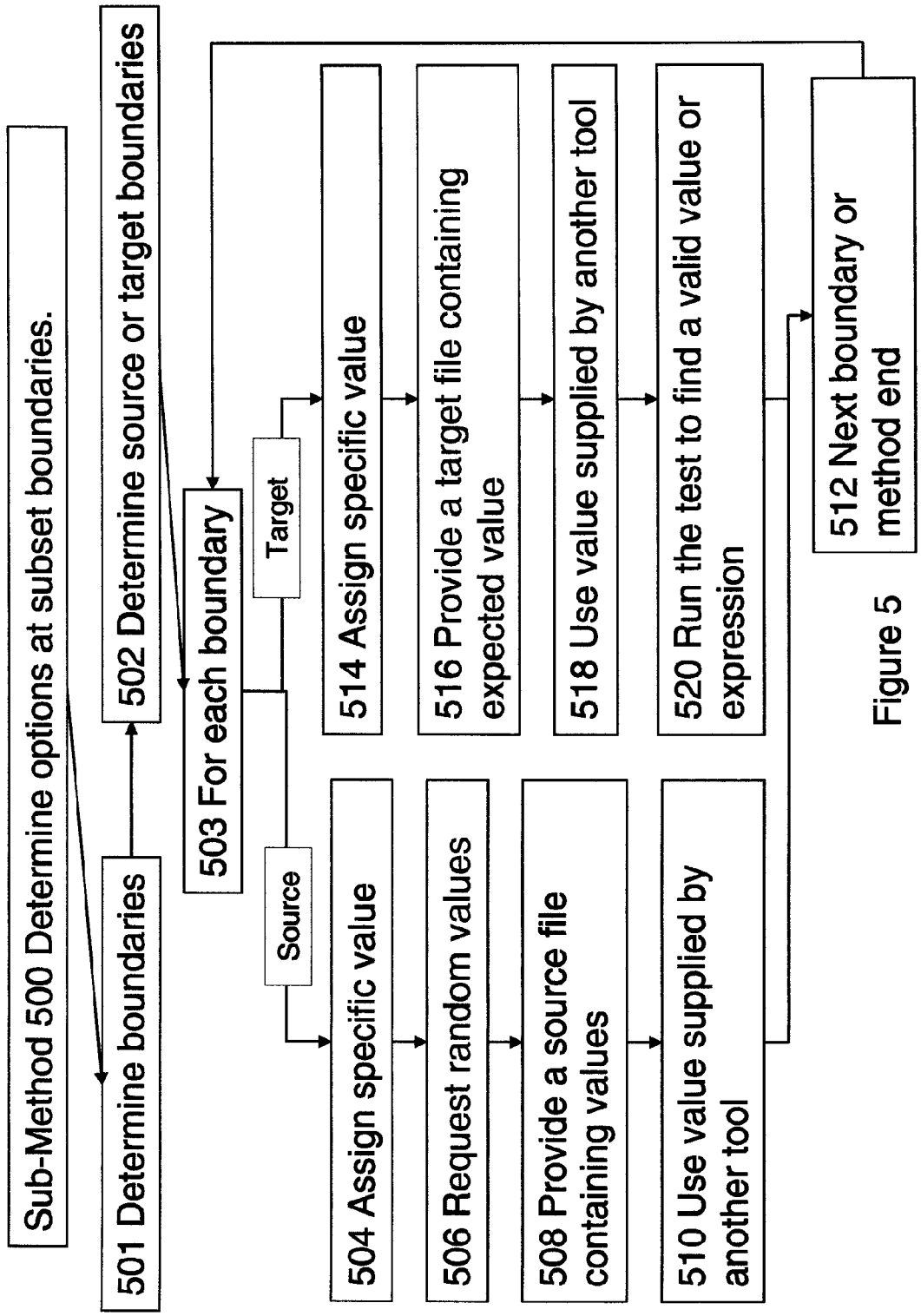
FIG. 5 is a flow diagram of a sub-method for determining options at boundaries according to an exemplary embodiment.

Referring to FIG. 5, a flow diagram of sub-method 500 for determining options at boundaries according to an exemplary embodiment comprises logical process blocks 501 to 520. As shown at block 501, the method 500 determining boundaries for the subset data transform units. As shown at block 502, the method 500 determining whether each boundary is a source or target boundary.

As shown at block 503, the method 500 includes defining a loop boundary from a first boundary to a last boundary for all boundaries in the subset of data transform units. If the loop boundary is a source boundary then sub-method 500 uses a default setting or requests a user to select one of block: 504, 506, 508 or 510 to set the source value and the process moves to block 512. However, if the loop boundary is a target boundary then sub-method 500 uses a default setting or requests a user to select one or more of blocks: 514; 516; 518; or 520 to validate the target value and the process then moves to block 512.

As shown at block 504, the method 500 includes assigning a specific value to a source boundary input. This value may be pre-determined or input by the user. As shown at block 506, the method 500 includes assigning a random value to the source boundary input. This is the default setting. As shown at block 508, the method 500 includes assigning a value from a source file containing values. As shown at block 510, the method 500 includes assigning a value supplied by another tool.

As shown at block 512, the method 500 includes looping back to block 503 if there is a further boundary in the loop else that is the end of sub-method 500 and control is returned to the calling process. As shown at block 514, the method 500 includes assigning a specific valid value to the target boundary. As shown at block 516, the method 500 includes providing a target file an expected valid value. As shown at block 518, the method 500 includes using a valid value supplied by another tool. As shown at block 520, the method 500 includes running the test to find a valid value or expression based on the results obtained. This is the default for target boundaries. A user may edit the located valid value or expression.

Figure 6:
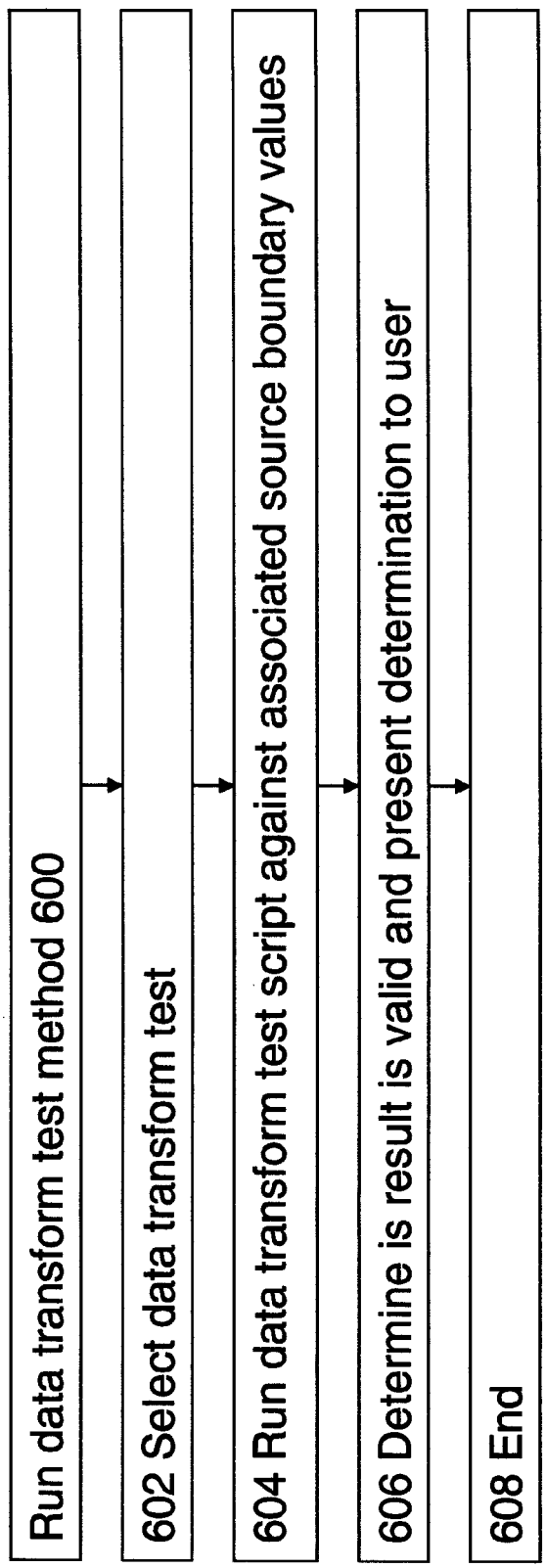
FIG. 6 is a flow diagram of a run data transform test method according to an exemplary embodiment.

Referring to FIG. 6, run data transform test method 600 comprises logical process blocks 602 to 608. As shown at block 602, the method 600 includes selecting a data transform test. As shown at block 604, the method 600 includes running the data transform test script against associated source boundary values from the associated boundary table. As shown at block 606, the method 600 includes determining if the results are valid according to the target boundary values and presenting the determination to the user. As shown at block 606, the method 600 concludes.

Referring to FIGS. 7A to 7H, example screen shots of data transform subset tester GUI 700 are described with respect to states of an exemplary embodiment starting from initiation and showing subsequent states of the create new data transform test method 400 and run data transform test method 600. Data transform subset tester GUI 700 comprises: window control 702; subset tester toolbar 704; data transform job frame 706; boundary frame 708; job name input field box 710; subset test name input box 712; and data transform editor 713 (data transform editor 713 is shown in FIG. 7B to 7H).

Window control 702 provides for minimizing; maximizing and closing of data transform subset tester GUI 700. Subset tester toolbar 704 provides the following controls for operating on a subset of job units: create 704.2; boundary 704.4; test 704.6; edit 704.8 and delete 704.10. Create 704.2 is a control for creating a subset of data transform units allowing selection of one or more graphical units as displayed in the data transform job frame 706 using lasso type selection or point and click selection. The name of the test is entered and displayed in test name input box 712. Selecting the create 704.2 control initiates create new data transform test method 400.

Boundary 704.4 is a control for allowing the user to set the boundary control mode. The default mode for an exemplary embodiment sets a random value for source value and uses the output of the test as a verified result. Test 704.6 is a control for running a test with an associated subset of data transform units. Selecting test 704.6 initiates run data transform test method 600. Edit 704.8 is a control for loading a test and allowing editing of the test including selection or de-selection of the subset of data transform units within the data transform test. Delete 704.10 is a control for deleting an existing test.

The data transform job frame 706 is for providing output and input for a data transform job using data transform editor 713. The data transform job is as selected by the user in job name input box 710. Entering a job name in the job name input box 710 initiates data transform editor 713 for that data transform job.

Boundary frame 708 is for displaying a boundary table (for example 210.1.1) for a particular job. Job name input field box 710 is a field input box providing an input interface for a job name. Subset test name input box 712 is a field input box providing an input interface for a subset test name. Data transform editor 713 is a graphical user interface providing a drawing interface for display and editing of graphical models.

Figure 7A:
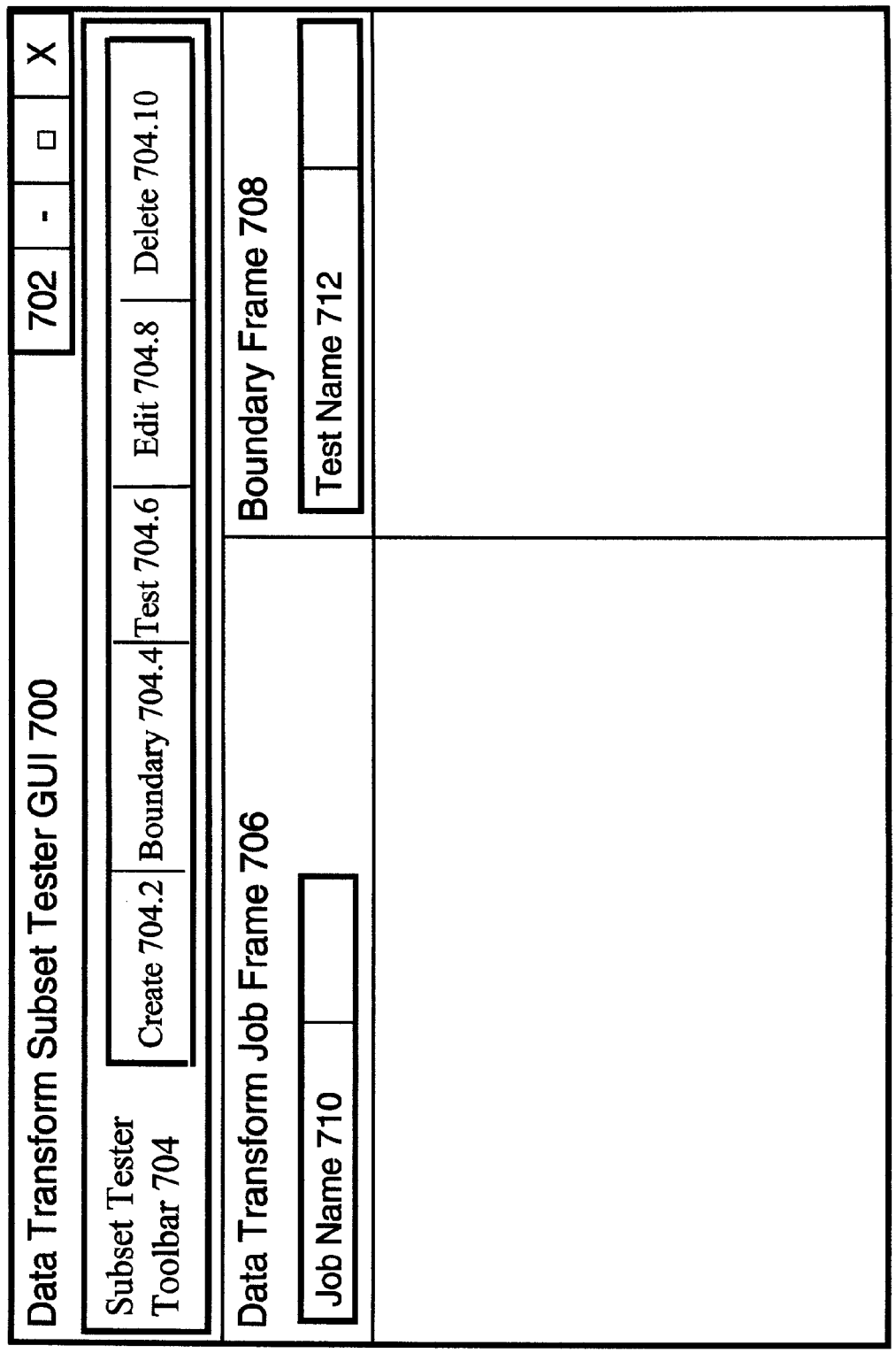

FIG. 7A shows data transform subset tester GUI 700 in a first state at the start of a process to create a test. A user has initiated data transform testing manager 200 and data transform subset tester GUI 700 is displayed. The data transform job frame 706 is empty; job name input box 710 is empty; test name input box 712 is empty; and boundary frame 708 is empty.

Figure 7B:
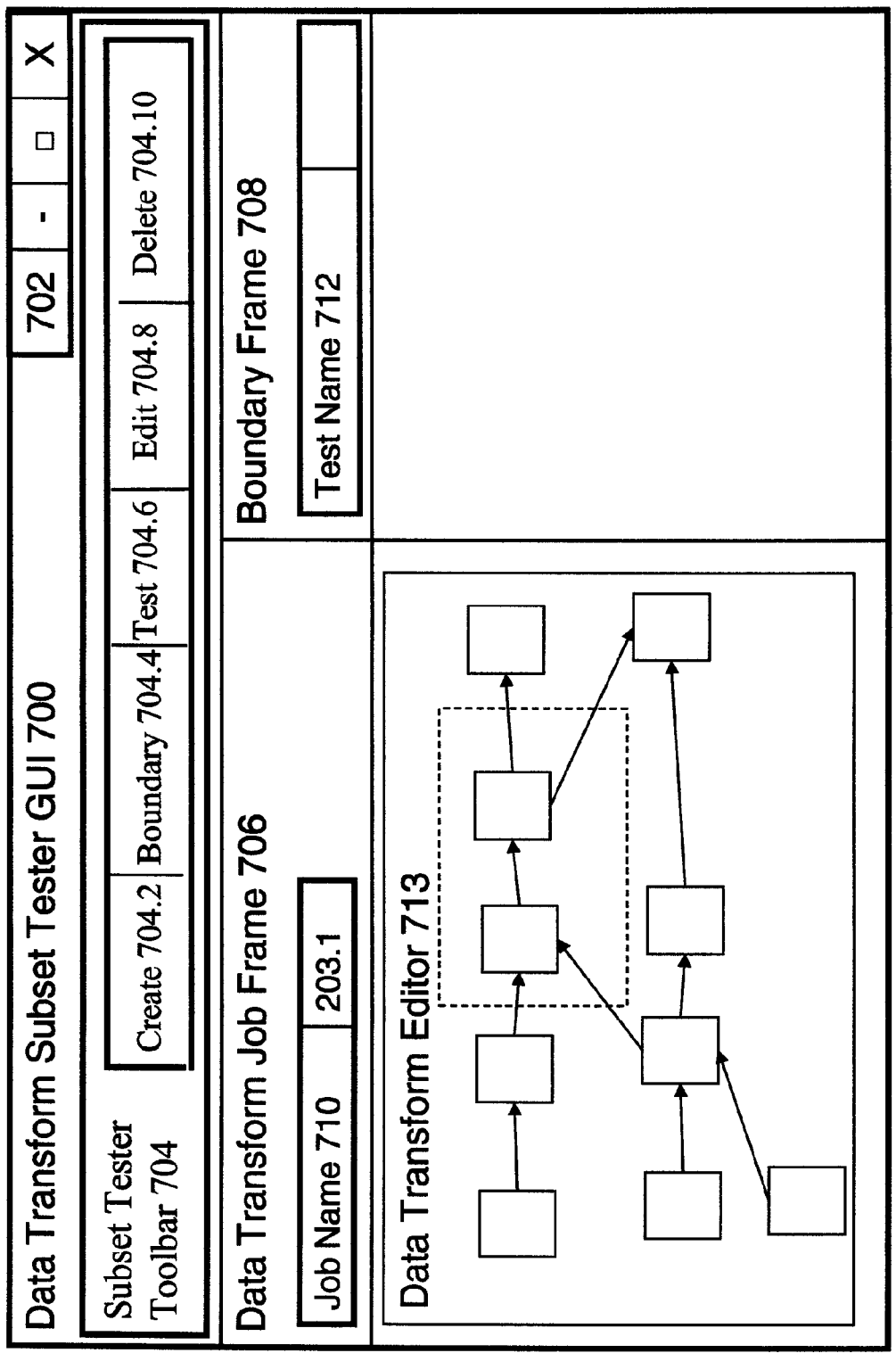

FIG. 7B shows a subsequent state where a user has selected create 704.2 control and initiates create new data transform test method 400. The user has entered '203.1' into job name input box 710 for data transform job 203.1. Data transform editor 713 displays and edits data transform job 203.1 in data transform job frame 706.

Figure 7C:
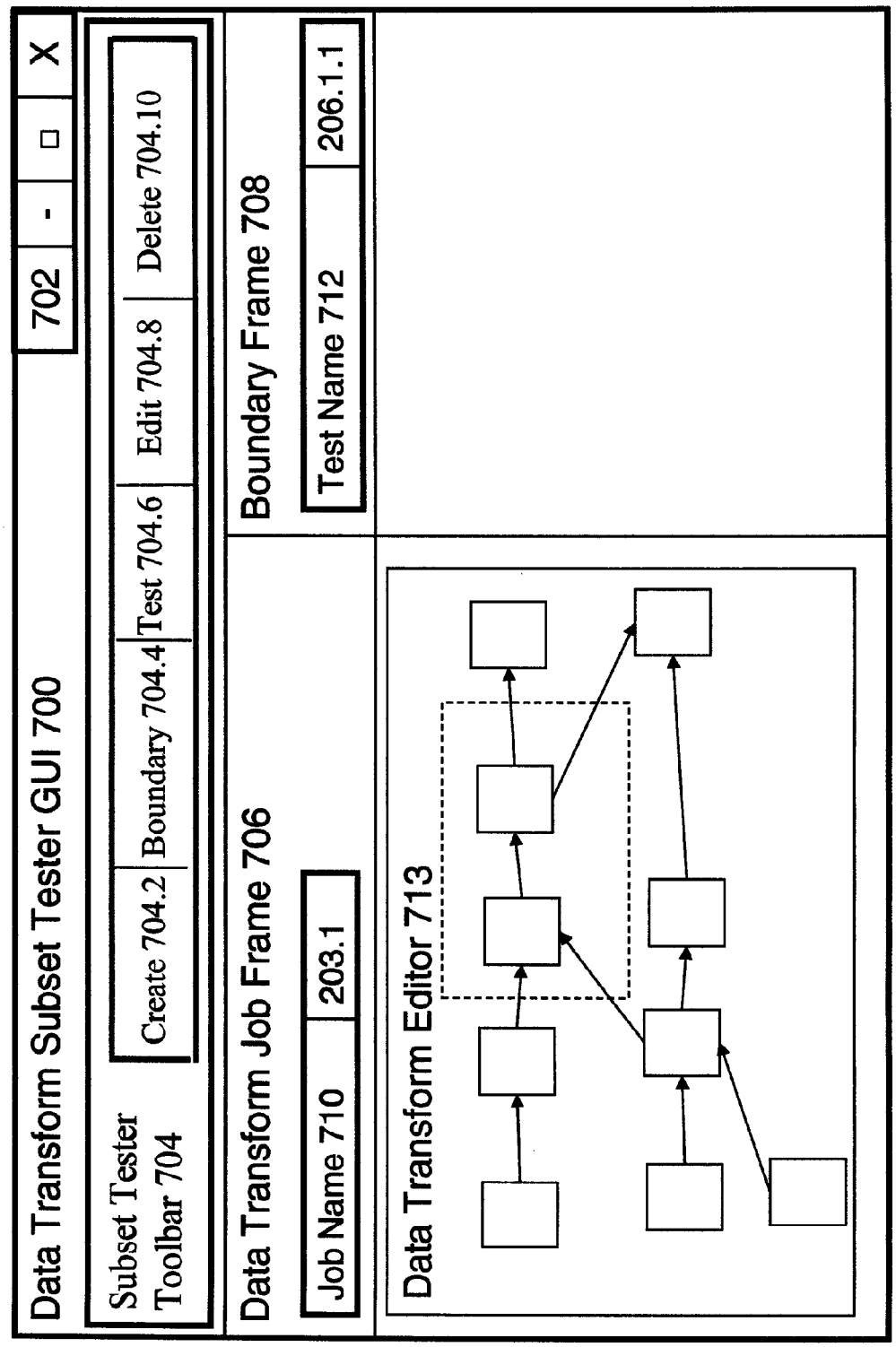

FIG. 7C shows a subsequent state of the create new data transform test method 400 after a user selects two data transform units in the data transform editor 713 using a dashed lasso selection technique (see dashed box). In this example test name 206.1.1 is created by data transform test manager 200 and '206.1.1' is displayed in test name input box 712 for editing by a user. The two selected data transform units form an association with the test name 206.1.1.

Figure 7D:
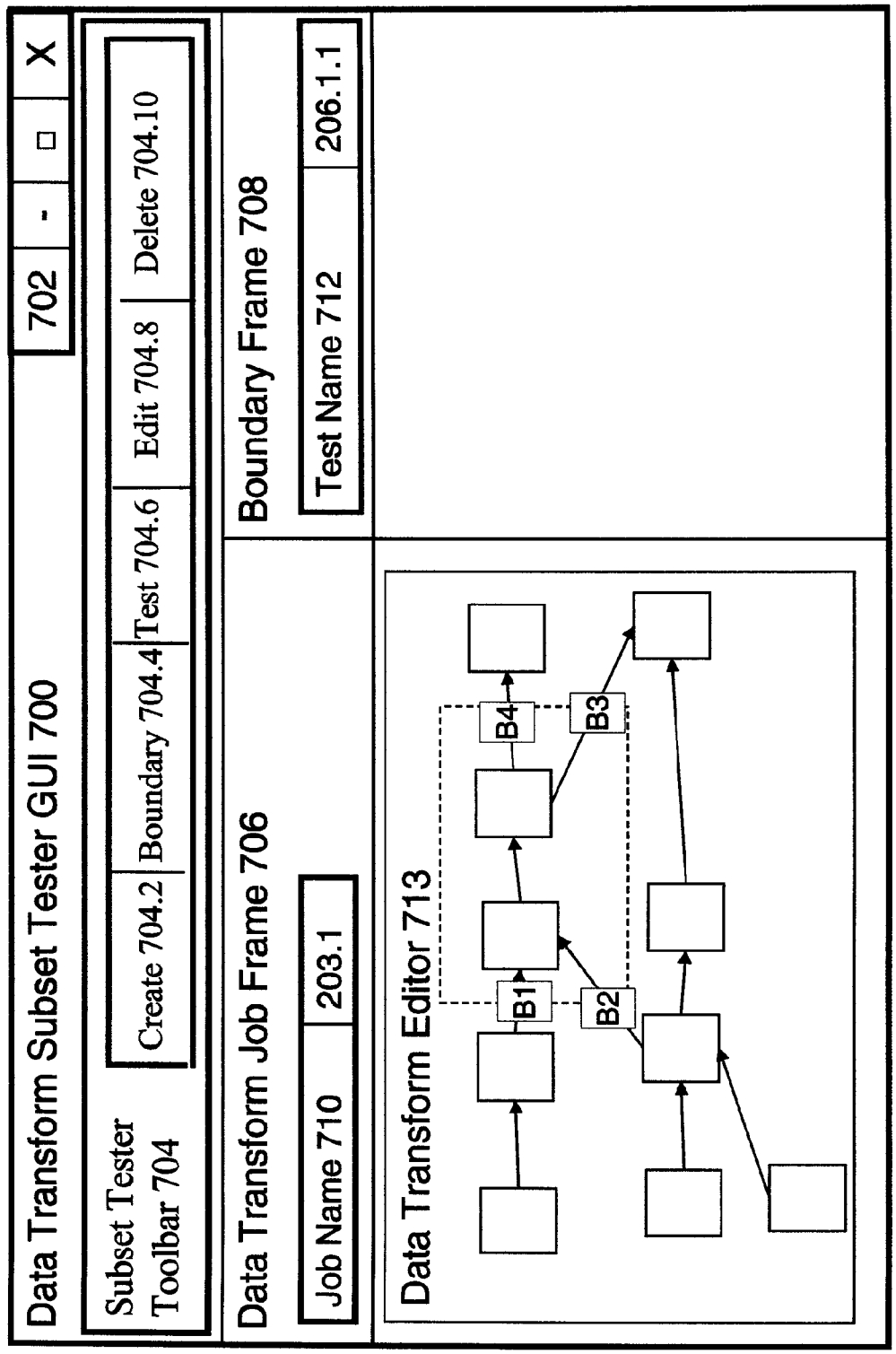

FIG. 7D shows a subsequent state with boundary labels B1, B2, B3, B4 indicating their respective input and output connections. Boundaries B1, B2, B3, and B4 are identified by data transform testing manager 200 before test data is determined for those boundaries.

FIG. 7E shows a subsequent state with boundary table 210.1.1 displayed with boundaries and corresponding selection mode. The default mode is selected so that data transform testing manager 200 can build the test data without further user intervention. At this stage data transform testing manager 200 has not determined whether the boundaries are source boundaries or target boundaries.

Figure 7F:
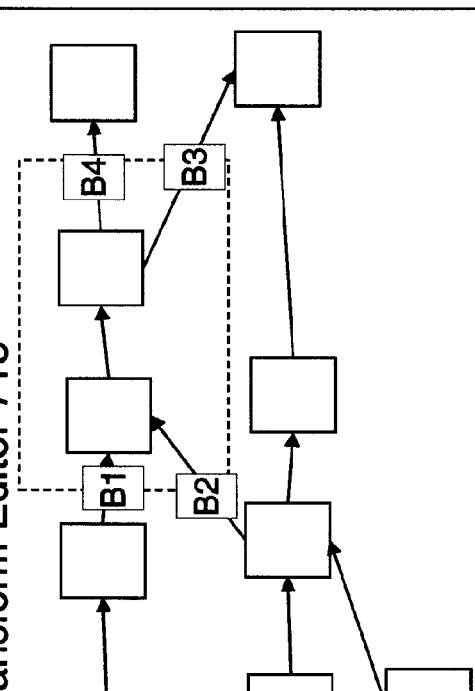

FIG. 7F shows a subsequent state where the stage data transform testing manager 200 has determined source boundaries and target boundaries. Boundary table 210.1.1 contains the result for each boundary. Boundaries B1 and B2 are identified as sources. Boundaries B3 and B4 are identified as targets.

Figure 7G:
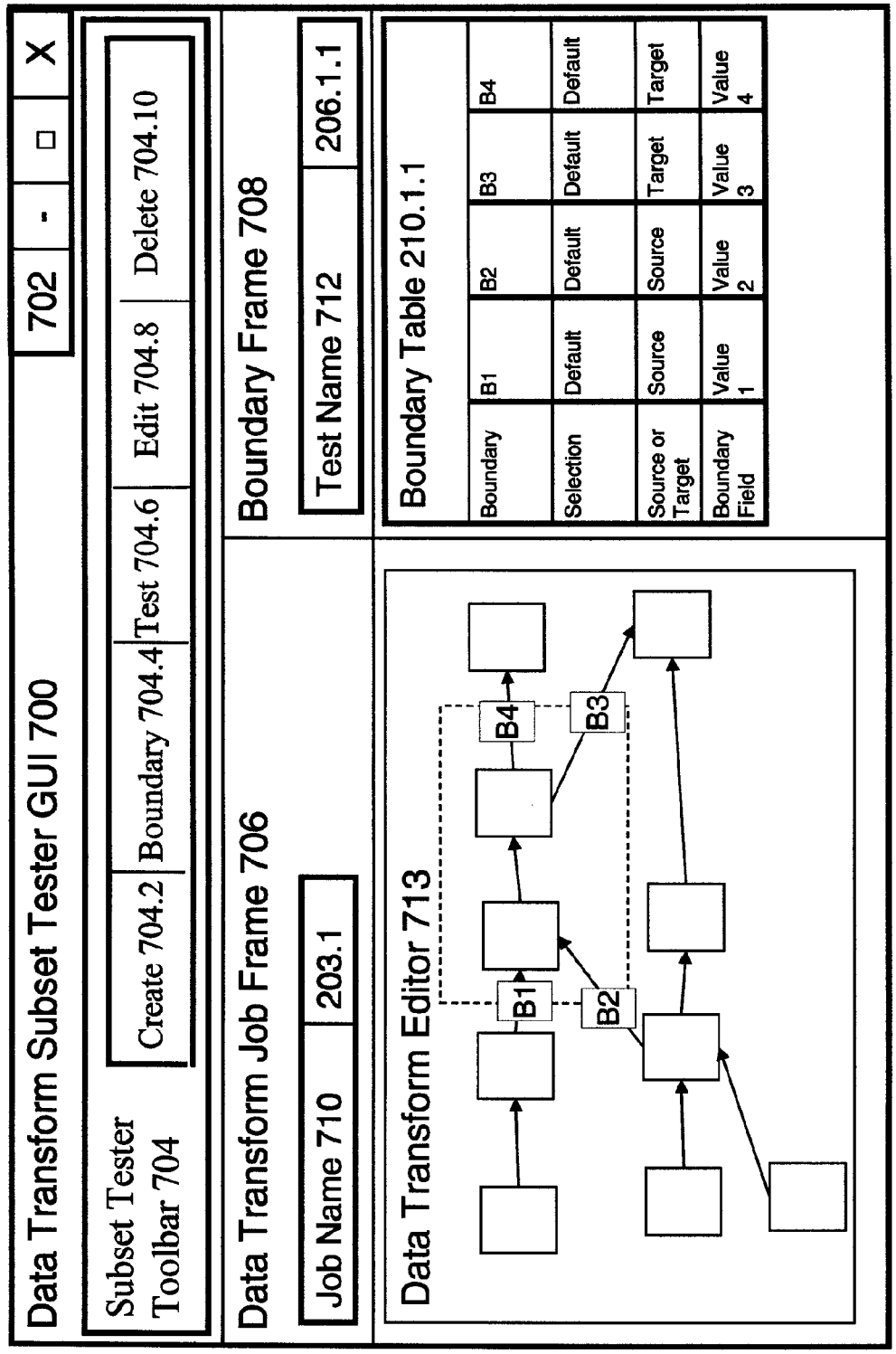

FIG. 7G shows a subsequent state where the stage data transform testing manager 200 has determined the boundaries values and boundary table 210.1.1 contains the result. At this stage the boundary table is saved with the transform job. The values are shown as Value1; Value2; Value3 and Value4. In practice these values are more complex than just a single value. A single boundary, say B1, would typically contain many fields (say "name", "address") and each of these fields would be assigned a single value.

Figure 7H:
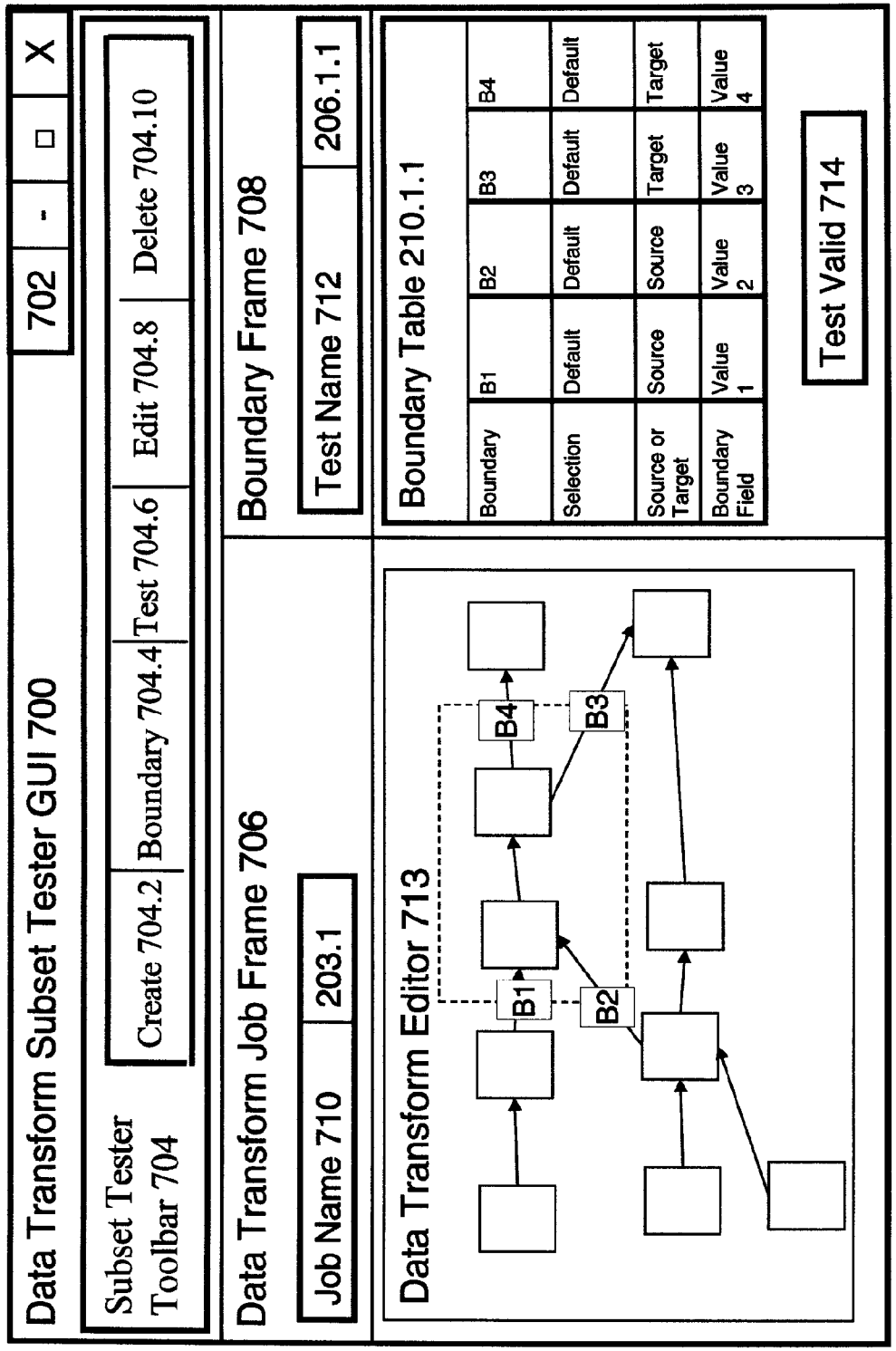

FIG. 7H show the final state where a user has selected the test 704.6 control to test the subset data transform units in the boundary table. If no changes have been made to the boundary table or the data transform job then the output values will be the same as the verification values in the boundary table and the test will succeed and a test valid box 714 is displayed.

When the values are changed by the user or the data transform job is changed then the result may be a test fail and the embodiment helps to determine how changes to the data transform job effect the final result.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of steps in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, blocks, operations, elements, and/or components, but do not preclude the presence or addition of one more other features, integers, blocks, operations, element components, and/or groups thereof.

The corresponding structures, materials, acts, and equivalents of all means or block plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The flow diagrams depicted herein are just one example. There may be many variations to this diagram or the blocks (or operations) described therein without departing from the spirit of the invention. For instance, the blocks may be performed in a differing order or blocks may be added, deleted or modified. All of these variations are considered a part of the claimed invention.

While an exemplary embodiment to the invention had been described, it will be understood that those skilled in the art, both now and in the future, may make various improvements and enhancements which fall within the scope of the claims which follow. These claims should be construed to maintain the proper protection for the invention first described.

What is claimed is:

1. A method for creating a data transform test for a data transform job having a data transform script, said method comprising:
    generating the data transform job that includes data transform units and a data transform test forming a tightly coupled data structure;
    determining all data transform units available in the data transform job,
    wherein each data transform unit comprises an execution script that is executed when the data transform job is performed, and
    wherein the data transform units define the data transform job and the execution scripts for each data transform unit are included in the data transform script;
    determining a subset of the available data transform units for a new test;
    generating a subset test execution script for the subset of data transform units from the execution scripts of the subset of data transform units included in the data transform script;
    determining boundary test data at each boundary of the subset of data transform units;
    defining the data transform test comprising: the subset of data transform units with subset test execution script and with boundary test data;
    saving the data transform test for later testing;
    determining a plurality boundaries for the subset of the available data transform units;
    determining whether each of the plurality of boundaries is a source boundary or target boundary;
    defining a loop boundary for each of a first boundary to a last boundary of the plurality of boundaries in the subset of the available data transform units;
    setting a source value in response to the loop boundary being a source boundary;
    validating a target value in response to the loop boundary being a target boundary;
    looping back to defining loop boundary in response to there being further boundaries in the plurality of boundaries until all boundaries are defined; and
    returning control to a calling process.

2. The method according to claim 1, wherein a block of determining boundary test data at each boundary point of the subset of transform units comprises determining different boundary options accordingly to whether that boundary is a data source or data target.

3. The method according to claim 2, further comprising for a data source boundary point, determining boundary test data as an input value according to one or more of the following criteria: a specific value; a random value; a value from a source file; and/or a value from another tool.

4. The method according to claim 2, further comprising for a data target boundary point, determining boundary test data as a valid output value according to one or more of the following criteria: a specific value; a value in a target file or a value in another tool.

5. The method according to claim 2, further comprising for a data target boundary point, determining boundary test data as a result provided by the subset test execution script.

6. The method according to claim 5, further comprising requesting that a user verify the result.

7. The method according to claim 5, wherein a test name is created when a new data transform test is created.

8. The method according to claim 7, wherein a user can edit the created test name.

9. The method according to claim 8, wherein the data transform test directly references the data transform job and is saved as part of the data transform job to enable portability of both job and test.

10. The method of claim 1, wherein setting the source value further comprising:
assigning a specific value to a source boundary input, wherein the specific value is at least one from a group including a random value, a value from a source file containing values, and a value supplied by another tool.

11. The method of claim 1, validating the target value comprises:
assigning a specific valid value to the target boundary, wherein the specific valid value is at least one from a group including a target file with an expected valid value, a valid value supplied by another tool, and running the test to find at least one of a valid value and expression based on the results obtained.

12. A system for creating a data transform test for a data transform job having a data transform script, said system comprising:
a memory having computer readable instructions; and
one or more processors for executing the computer readable instructions using one or more process engines, the computer readable instructions comprising:
generating the data transform job that includes data transform units and a data transform test forming a tightly coupled data structure;
determining all data transform units available in the data transform job,
wherein each data transform unit comprises an execution script that is executed when the data transform job is performed, and
wherein the data transform units define the data transform job and the execution scripts for each data transform unit are included in the data transform script;
determining a subset of the available data transform units for a new test;
generating a subset test execution script for the subset of data transform units from the execution scripts of the subset of data transform units included in the data transform script;
determining boundary test data at each boundary of the subset of data transform units;
defining the data transform test comprising: the subset of data transform units with subset test execution script and with boundary test data; and storage for saving the data transform test for later testing;
determining a plurality boundaries for the subset of the available data transform units;
determining whether each of the plurality of boundaries is a source boundary or target boundary;
defining a loop boundary for each of a first boundary to a last boundary of the plurality of boundaries in the subset of the available data transform units;
setting a source value in response to the loop boundary being a source boundary;
validating the target value in response to the loop boundary being a target boundary;
looping back to defining loop boundary in response to there being further boundaries in the plurality of boundaries until all boundaries are defined; and
returning control to a calling process.

13. The system according to claim 12, wherein the process engine for determining boundary test data at each boundary point of the subset of transform units comprises additional logical elements for determining different boundary options accordingly to whether that boundary is a data source or data target.

14. The system according to claim 13, further comprising for a data source boundary point, a process engine for determining boundary test data as an input value according to one or more of the following criteria: a specific value; a random value; a value from a source file; and/or a value from another tool.

15. The system according to claim 13, further comprising for a data target boundary point, a process engine for determining boundary test data as a valid output value according to one or more of the following criteria: a specific value; a value in a target file or a value in another tool.

16. The system according to claim 13, further comprising for a data target boundary point, a process engine for determining boundary test data as a result provided by the subset test execution script.

17. The system according to claim 16, further comprising a user interface for requesting that a user verify the result.

18. The system according to claim 17, wherein a test name is created when a new data transform test is created.

19. The system according to claim 18 wherein a user can edit the created test name.

20. The system according to claim 19, wherein the data transform test directly references the data transform job and is saved as part of the data transform job to enable portability of both job and test.

21. A computer program product for creating a data transform test for a data transform job having a data transform script, said computer program product comprising non-transitory computer readable medium having computer readable code stored thereon for performing a method comprising:
generating the data transform job that includes data transform units and a data transform test forming a tightly coupled data structure;
determining all data transform units available in the data transform job,
wherein each data transform unit comprises an execution script that is executed when the data transform job is performed, and wherein the data transform units define the data transform job and the execution scripts for each data transform unit are included in the data transform script;

determining a subset of the available data transform units for a new test;

generating a subset test execution script for the subset of data transform units from the execution scripts of the subset of data transform units included in the data transform script;

determining boundary test data at each boundary of the subset of data transform units;

defining the data transform test comprising: the subset of data transform units with subset test execution script and with boundary test data;

saving the data transform test for later testing;

determining a plurality boundaries for the subset of the available data transform units;

determining whether each of the plurality of boundaries is a source boundary or target boundary;

defining a loop boundary for each of a first boundary to a last boundary of the plurality of boundaries in the subset of the available data transform units;

setting a source value in response to the loop boundary being a source boundary;

validating a target value in response to the loop boundary being a target boundary;

looping back to defining loop boundary in response to there being further boundaries in the plurality of boundaries until all boundaries are defined; and returning control to a calling process.

22. A computer program stored on a non-transitory computer readable medium and loadable into the internal memory of a digital computer, comprising software code portions, when said program is run on a computer, for performing a method comprising:

generating the data transform job that includes data transform units and a data transform test forming a tightly coupled data structure;

determining all data transform units available in the data transform job, wherein each data transform unit comprises an execution script that is executed when the data transform job is performed, and wherein the data transform units define the data transform job and the execution scripts for each data transform unit are included in the data transform script;

determining a subset of the available data transform units for a new test;

generating a subset test execution script for the subset of data transform units from the execution scripts of the subset of data transform units included in the data transform script;

determining boundary test data at each boundary of the subset of data transform units;

defining the data transform test comprising: the subset of data transform units with subset test execution script and with boundary test data;

saving the data transform test for later testing;

determining a plurality boundaries for the subset of the available data transform units;

determining whether each of the plurality of boundaries is a source boundary or target boundary;

defining a loop boundary for each of a first boundary to a last boundary of the plurality of boundaries in the subset of the available data transform units;

setting the source value in response to the loop boundary being a source boundary;

validating a target value in response to the loop boundary being a target boundary;

looping back to defining loop boundary in response to there being further boundaries in the plurality of boundaries until all boundaries are defined; and returning control to a calling process.

* * * * *